United States Patent
Ciliberti et al.

(10) Patent No.: US 8,419,896 B2
(45) Date of Patent: Apr. 16, 2013

(54) SEMI-AUTOMATED REWORKABILITY PROCESS FOR DE-BONDING A DISPLAY

(75) Inventors: Michael N. Ciliberti, East Fallowfield, PA (US); Charles W. Dodson, Jr., Morgantown, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/120,458

(22) PCT Filed: Nov. 20, 2009

(86) PCT No.: PCT/US2009/065269
§ 371 (c)(1),
(2), (4) Date: Mar. 23, 2011

(87) PCT Pub. No.: WO2010/059906
PCT Pub. Date: May 27, 2010

(65) Prior Publication Data
US 2011/0180218 A1    Jul. 28, 2011

Related U.S. Application Data

(60) Provisional application No. 61/116,313, filed on Nov. 20, 2008.

(51) Int. Cl.
*B32B 38/10* (2006.01)
(52) U.S. Cl.
USPC ........... 156/717; 156/703; 156/705; 156/711; 156/761; 156/762; 156/924; 156/937
(58) Field of Classification Search .................. 156/703, 156/705, 711, 717, 761, 762
See application file for complete search history.

(56) References Cited

U.S. PATENT DOCUMENTS

| | | | |
|---|---|---|---|
| 4,683,792 A * | 8/1987 | Demont ........................ | 83/874 |
| 4,843,203 A | 6/1989 | Gamo et al. | |
| 5,678,303 A * | 10/1997 | Wichmann ..................... | 29/806 |
| 5,748,269 A | 5/1998 | Harris et al. | |
| 5,918,517 A * | 7/1999 | Malapert et al. ................ | 83/171 |
| 6,139,953 A | 10/2000 | Nagamoto et al. | |
| 6,832,538 B1 * | 12/2004 | Hwang ......................... | 83/809 |
| 7,150,804 B2 | 12/2006 | Tajima | |
| 8,118,075 B2 * | 2/2012 | Sampica et al. ............. | 156/762 |
| 2003/0089214 A1 * | 5/2003 | Fukuta et al. ................ | 83/651.1 |
| 2003/0121601 A1 * | 7/2003 | Tajima .......................... | 156/254 |
| 2005/0146660 A1 | 7/2005 | Wang et al. | |
| 2005/0179360 A1 | 8/2005 | Okamoto et al. | |
| 2008/0037285 A1 | 2/2008 | Eda | |
| 2011/0134385 A1 | 6/2011 | Farah et al. | |

FOREIGN PATENT DOCUMENTS

EP         0993016         4/2000

OTHER PUBLICATIONS

ISR and WO of the ISA in PCT/US2009/065269, PCT counterpart of the present application, Lee W. Young, Authorized Officer, ISA/US, USPTO, Alexandria, Virginia 2313-1450, Jan. 13, 2010.

* cited by examiner

*Primary Examiner* — Mark A Osele
*Assistant Examiner* — Nickolas Harm

(57) ABSTRACT

A method for reworking a bonded display (e.g., a bonded LCD) having a substrate (e.g., plate or film) adhesively bonded to a face (e.g., front face) of the display. The method provides for efficient and clean removal of the substrate from the bonded display when necessary (e.g., when defect(s) are present) to afford a de-bonded display that is undamaged such that the resulting de-bonded display (e.g., de-bonded LCD) can subsequently be re-bonded as a component in a device being manufactured.

20 Claims, 3 Drawing Sheets

SEMI-AUTOMATED REWORKABILITY PROCESS FOR DE-BONDING A DISPLAY

This application claims priority to U.S. provisional patent application No. 61/116,313 filed on Nov. 20, 2008.

FIELD OF THE INVENTION

The invention is directed to a method for reworking an adhesively bonded display, such as a liquid crystal display (LCD).

BACKGROUND OF THE INVENTION

In today's market, flat panel displays, such as liquid crystal displays (LCD), are often enhanced with specialized films. The films may be flexible or rigid. Such films are designed to optimize optical performance, e.g., viewing contrast, increasing brightness, removing glare, enhancing color and enhancing the clarity of the flat panel display or improve display functionality, such as bonding a touch panel to the front surface. The films are typically applied to the viewing side of the display. Application methods involve the use of an adhesive that is optically clear and pressure sensitive for easy bonding directly to the display.

Curable adhesives (e.g., heat or light cured) have been used in applications where substrates require substantial permanency and high strength adherence. Conventional adhesives (e.g., tape, silicone), however, are typically not easy to apply, or provide the benefits of curable adhesives. An adhesive material for application of a film to a base material is described in U.S. Pat. No. 6,139,953. For optical product applications, curable adhesives have been desirable, as they can provide optically clear, strongly adhered laminates (e.g., layered substrates).

To achieve both strength and ease of application, hybrid compositions have been developed that can be used in optical applications. For example, a light curable, polyester based adhesive has been used for plastic glazing applications. In digital video disc (DVD or optical discs) bonding and cathode ray tube (CRT) applications, a liquid adhesive formulation has been used. For bead bonding in making retroreflective articles, a curable polymeric network has been suggested.

Strength and application, however, are not the only criteria that many optical substrates/laminates require. Certain optical products are exposed to harsh environmental conditions, such as heat, UV (solar) light, water, etc. For example, vehicle windshields generally exist in outdoor conditions that submit them to all types of weather. These windshields typically include substrates such as acrylic or polycarbonate, adhered to a solar or infra-red (IR) reflecting film made from a multi-layer optical film (MLOF) (commercially available from 3M Co., St. Paul, Minn.). The materials may become optically obstructed if the adhesion between the layers is damaged or compromised.

Light curable liquid acrylic ester adhesives for glass bonding using low intensity ultraviolet ("UV") light are known. Such adhesives are useful for glass assembly and repair applications in which high intensity UV light is unavailable or impractical.

A number of fast curing low-yellowing acrylate functional oligomer products are known for use in UV/electron beam ("EB") curable printing inks and the like. However, such products typically have poor adhesive strength to glass.

It is desirable and often necessary for a viable commercial UV/visible curable adhesive suitable for glass bonding to possess several key properties—e.g., having good adhesive strength, fast tact time, optical clarity and reduced yellowing.

An additional key property that is highly desirable in an optical adhesive (in the cured state) targeted for use in display applications is reworkability. With regard to reworkability, one or more events can occur during manufacture, shipping, and/or in use that requires the film and adhesive to be removed easily and cleanly from the display and replaced. Some examples of such events are 1) defects in bonding during application of the specialized film to the display may necessitate on-site repair, 2) damage to an LCD occurring during its use, and 3) a component (e.g., LCD, glass, touch panel) of a device becoming defective after placement in the device. Present commercially available adhesives and associated methods fall short with regard to reworkability and with regard to one or more of the above-mentioned other key properties. The present invention offers a solution towards reworkability in providing an efficient rework method that is cost-effective, semi-automated, safe, and reliable.

SUMMARY OF THE INVENTION

In an embodiment, the invention is a method for reworking a bonded display having a surface and a substrate adhesively bonded with a cured adhesive layer to the surface of the display, the method comprising:

a) advancing the bonded display, from an edge or a corner of the display to an opposing edge or an opposing corner of the display, through a line in a manner such that the cured adhesive layer contacts the line resulting in break-up of the adhesive layer such that the substrate is no longer bonded to the display; and b) removing the cured adhesive layer from the display to afford a de-bonded display and the substrate.

In one embodiment, the invention is a method for reworking a bonded liquid crystal display having a surface and a substrate adhesively bonded with a cured adhesive layer to the surface of the display, the method comprising:

a) advancing the bonded liquid crystal display, from an edge or a corner of the display to an opposing edge or an opposing corner of the display, through a line in a manner such that the cured adhesive layer contacts the line resulting in break-up of the adhesive layer such that the substrate is no longer bonded to the liquid crystal display; and b) removing the cured adhesive layer from the liquid crystal display to afford a de-bonded liquid crystal display and the substrate.

GLOSSARY OF TERMS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements, but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

Also, use of "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. The materials, methods, and Examples described herein are illustrative only and not intended to be limiting.

Figure 1:
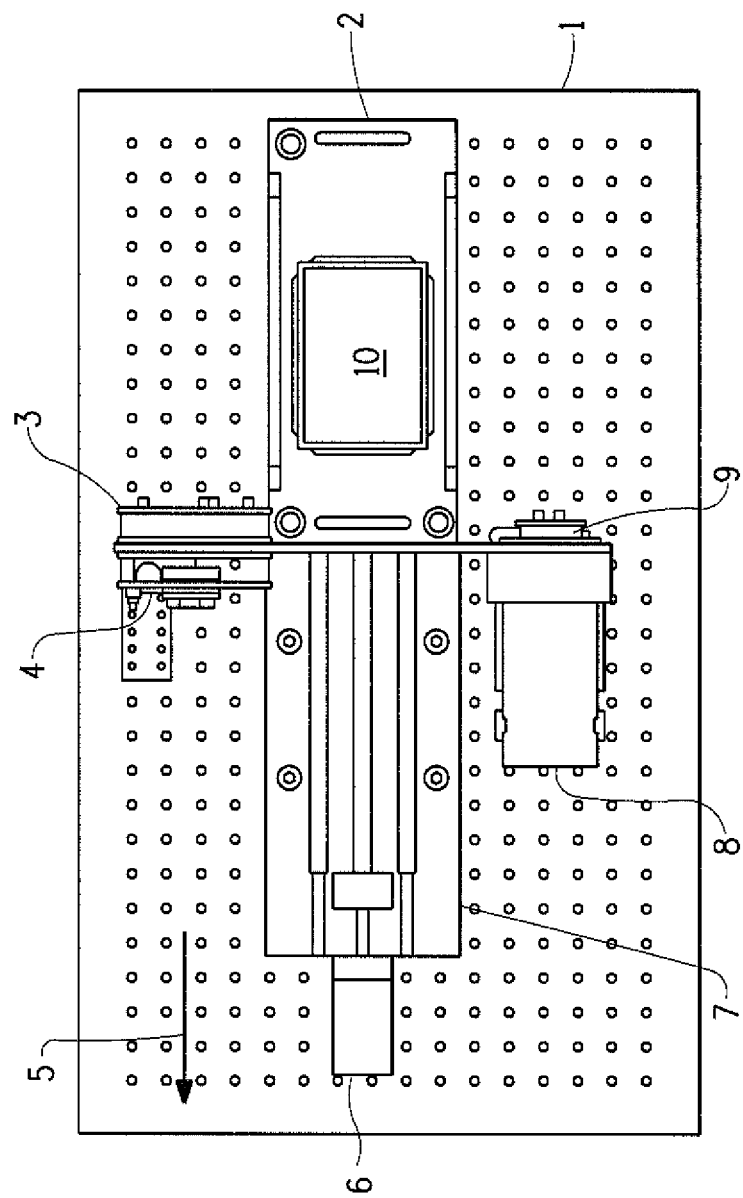
FIG. 1 is a top view of the semi-automated equipment that was used to effect de-bonding of test samples/displays as described herein.
Figure 2:
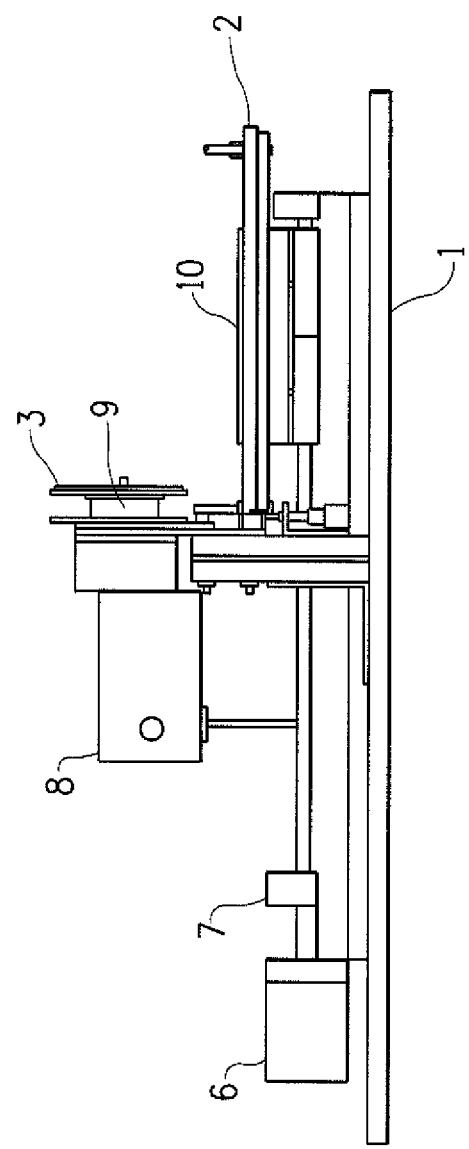
FIG. 2 is a side view of this equipment.
Figure 3:
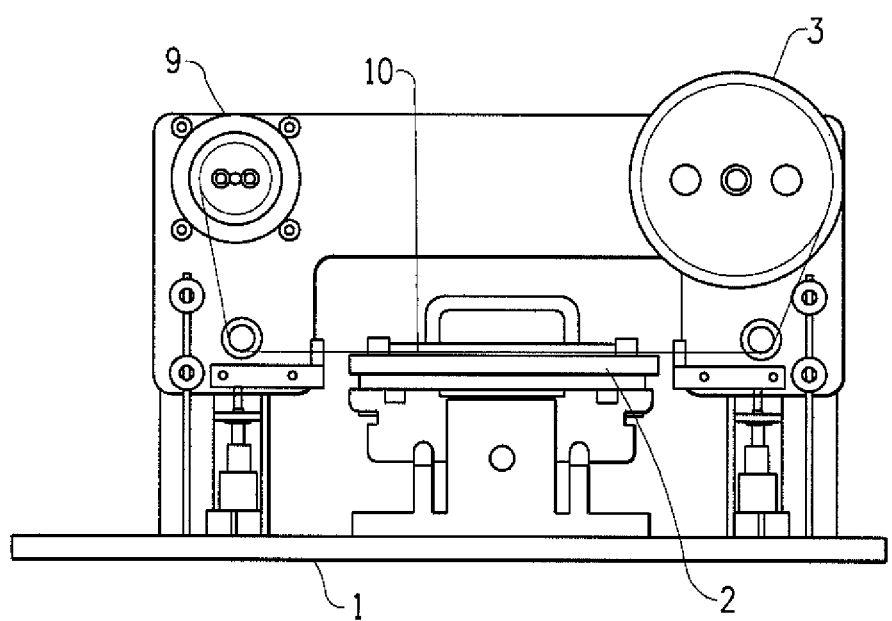
FIG. 3 is a front view of this equipment.

In each of the FIGS. 1-3, (1) base plate to mount components; (2) mounting jig to hold display or sample during cutting process; (3) cutting line spool; (4) friction brake to control cutting line tension; (5) process direction; (6) linear slide drive motor; (7) linear slide; (8) motor to pull thread; (9) take-up spool; (10) display or sample.

DETAILED DESCRIPTION OF THE INVENTION

In an embodiment, the invention is a method for reworking a display having a surface and a substrate adhesively bonded with a cured adhesive layer to the surface of the display, the method comprising:

a) advancing the bonded display, from an edge or a corner of the display to an opposing edge or an opposing corner of the display, through a line in a manner such that the cured adhesive layer contacts the line resulting in break-up of the adhesive layer such that the substrate is no longer bonded to the display; and b) removing the cured adhesive layer from the display to afford a de-bonded display and the substrate.

The method of the invention for reworking a display is applicable to many different types of displays including, but not limited to, liquid crystal displays (LCDs), organic light-emitting diode (OLED) displays, plasma displays, light-emitting diode (LED) displays, and other types of displays. The method of the invention is applicable to de-bonding essentially any display that includes a reworkable, optical adhesive.

In this invention, break-up of the adhesive layer includes and encompasses, but is not limited to, the following descriptors: cutting, shearing, slicing, and sawing.

The line can either be a moving line or a non-moving line. A moving line is suitable.

In an embodiment, the line is initially within 10 degrees of being orthogonal to the direction of the cured adhesive layer as the bonded display is being advanced. In another embodiment, the line is within 5 degrees of being orthogonal to the direction of the cured adhesive layer as the bonded display is being advanced.

In an embodiment, the line is selected from the group consisting of a fiber, a rope, a thread, a wire, a sheet, a blade and a cutting edge. In an embodiment, the line is selected from the group consisting of a fiber, a rope, a thread, and a wire. In an embodiment, the line is a fiber. In an embodiment, the line is a rope. In an embodiment, the line is a thread. In an embodiment, the line is a wire. In various embodiments, the line can be comprised of two or more of the above elements (e.g., fiber, thread, rope, and wire).

In an embodiment, the line comprises a braided material. In another embodiment, the line comprises a non-woven material. In yet another embodiment, the line comprises a monofilament material. Braided and non-woven materials are suitable over monofilament materials for use in this invention. A braided material is preferred over a non-woven material and a braided material containing at least three strands in its braid is most suitable. While not being bound by theory, the inventors believe that braided and non-woven materials provide more surface texture than does a monofilament material and that having such texture is advantageous in promoting a sawing/cutting action of the line during de-bonding. Achieving a sawing-like action of the moving line during a de-bonding run is believed by the inventors to one key requirement to achieving an efficient and effective de-bonding of a display or test sample. With regard to texture of a braided, woven, or non-woven line, a line having the largest degree of surface roughness is best and is preferred over those lines having lower degrees of surface roughness.

Furthermore, braided materials, and to a lesser extent non-woven materials, provide for a greater strength to diameter ratio of the line with their use in comparison to that for a monofilament material. Having a line material that has a sufficiently high strength to diameter ratio is a second key aspect of this invention in that the diameter of the line preferably is less than the thickness of the cured adhesive that is to be de-bonded but this line diameter to adhesive thickness relationship is not a requirement. Such cured adhesive thicknesses are typically 0.5 mm or less and can be 0.2 mm or less.

The minimum tensile strength/diameter ratio for a line that is suitable for use depends upon the display/sample size being subjected to de-bonding according to the invention. For a rectangular display of dimensions A×B, the dimension A or B of smaller magnitude is the smaller side dimension and it is this side of the display that first contacts the line to begin de-bonding according to the invention. For example, for the standard glass test sample of dimensions 4 inches×6 inches, one of the sides of 4" length is the side where de-bonding is first initiated.

In an embodiment for use in de-bonding displays where the smaller side dimension is greater than 4 inches, the line has a tensile strength (measured in pounds as reported by the manufacturer) to diameter (measured in millimeters) value of at least 80 pounds per millimeter. In an embodiment for use in de-bonding displays where the smaller side dimension is less than or equal to 4 inches, the line has a tensile strength (measured in pounds as reported by the manufacturer) to diameter (measured in millimeters) value of at least 40 pounds per millimeter. (This tensile strength to diameter ratio can be smaller for small size displays.) Suitably, this value is at least 100 pounds per millimeter and, more suitably, this value is at least 150 pounds per millimeter. A most suitable line according to the invention with regard to line strength is one having the highest strength to diameter value and the smallest diameter, with the diameter of the line preferably being less than the thickness of the bonded adhesive layer to be de-bonded but the latter is not a necessary requirement.

In an embodiment, the line is moving and has a line speed that ranges from about 1 foot/minute to about 80 feet/minute. A line speed as high as 80 feet/minute is suitable in this invention but this high a line speed is believed to be a higher line speed than is needed in most instances and consequently choosing this high a line speed for de-bonding may be a waste of cutting thread. In an embodiment, the line is moving and has a line speed that ranges from about 10 feet/minute to about 80 feet/minute. In an embodiment, the line is moving and has a line speed that ranges from about 20 feet/minute to about 70 feet/minute. In an embodiment, the line is moving and has a line speed that ranges from about 40 feet/minute to about 50 feet/minute, and, for example, is about 45 feet/minute. In an embodiment, the line is moving and has a line speed that ranges from about 30 feet/minute to about 40 feet/minute, and, for example, is about 36 feet/minute.

Suitable line speeds and table speeds are related to each other. For example, if the table speed is a given value and if the line speed is too low for this table speed, the line has a tendency to not cut the adhesive bond and thereby leading to adhesive build-up under the glass, which may result in breakage of the glass and/or line. If the line speed is too high for a given table speed, at least two deleterious effects may result. One is that the adhesive may tend to soften and/or to melt, which effects tend to lower the propensity for a sawing action and which may cause damage to the surrounding areas and cause the line to break. The other is excessive use/wastage of the line.

With regard to table speed, if the table speed is set too fast, the line doesn't have sufficient time to effectively saw through the adhesive, unless the thread speed is substantially increased and this increased line speed results in excessive thread use. If the table speed is set too low, there may not be sufficient force applied against the adhesive bond for the line to effectively saw/cut through the adhesive, such that adhesive may consequently build-up under the glass. Several failures believed to be due to this latter factor were observed in the testing that was done.

It is recognized that the aforementioned line speeds are best suited for displays or test samples that are approximately the same size as the 4 inch×6 inch test samples used in the testing described in the Examples. For larger displays or test samples, a higher line speed than described above may afford better results. For example, de-bonding of a 12.1 inch (diagonal measurement) as described in Example 13 was done effectively and efficiently at 50-60 feet/minute as the line speed with a table speed of 1 foot/minute. This line speed is higher than the preferred range of 30-40 feet minute indicated above for the smaller sample/display size.

In an embodiment, the bonded display is advanced through the line to effect de-bonding of the display at a table speed ranging from about 0.01 feet/minute to about 10 feet/minute. In an embodiment, the bonded display is advanced through the line to effect de-bonding of the display at a table speed ranging from about 0.1 feet/minute to about 5 feet/minute. In an embodiment, the bonded display is advanced through the line to effect de-bonding of the display at a table speed ranging from about 0.1 feet/minute to about 3 feet/minute. In an embodiment, the bonded display is advanced through the line to effect de-bonding of the display at a table speed ranging from about 0.5 feet/minute to about 2.0 feet/minute and, for example, at about 1 foot/minute.

In an embodiment, the bonded display is contained within a holder during execution of the method to effect de-bonding. The bonded display or test sample may be placed within the holder for de-bonding either with substrate (e.g., glass) positioned above the display or below the display.

In an embodiment, the line comprises a metal. Examples of suitable metals include, but are not limited to, nickel-chromium, tungsten, and Inconel® alloy. In other embodiments, these lines comprise nickel-chromium wire and Inconel® wire.

In an embodiment, the line comprises a textured conductive material having a rough surface.

In an embodiment, the line is a heated element that is heated to a temperature above ambient temperature during execution of the method. Suitable temperatures above ambient can range from about 30° C. to about 550° C., depending upon particular characteristics and properties of the heated element.

In an embodiment, the line is vibrated at ultrasonic frequencies during execution of the method. Various methods that can be utilized to effect vibration of the line include, but are not limited to, use of magnetic coils or piezoelectric multi-vibrators. Such ultrasonic vibration is prophesized to be effective in break-up of bonding between cured adhesive and the substrate and/or the display (e.g., liquid crystal display).

In an embodiment, the line is moving and is passed through the cured adhesive layer of the bonded display in a reciprocating motion perpendicular to the direction that the cured adhesive layer is being advanced. Under these conditions, it is prophesized that the line will form a parabolic arc while "sawing action" takes place and that this arc size will vary depending on the table (transport) speed that the bonded display is being advanced through the moving line and the properties of the adhesive and its thickness in the bonded display.

In an embodiment, the line comprises a chemically pretreated element with a chemical that serves to afford and/or assist in bond breakage of the cured adhesive layer. Suitable pretreatment chemicals are prophesized to include, but are not limited to, isopropanol, acetone, and ethanol. Also expected to be effective is some other known or developed substance that would aid in breaking bonding between the substrate (e.g., glass) and/or the display and the cured adhesive. A suitable substance, for example, is prophesized to be a coated material, such as a Teflon®-coated material.

The method of the invention for reworking an adhesively bonded display essentially can be divided into two steps: 1) separation of substrate from the display and 2) removal of adhesive from the display. The disclosure presented above is directed to the first step. With regard to the removal of adhesive (second step), this can be done in any manner known without limitation and can involve a manual removal, a semi-automated removal, or even automated-removal. As one example, manual removal of adhesive can often be done effectively by a rolling-action being applied to the adhesive at one or more adhesive edge(s) to afford further agglomeration of adhesive into one (or a few) mass(es) which can be essentially rolled off of the display to remove a major portion of the adhesive. Next, any residual solid adhesive material is removed from the display surface and nearby surfaces (e.g., bezel, etc.). Finally any small portions of adhesive residue that still remain can be removed with a suitable solvent (e.g., isopropyl alcohol).

DEFINITIONS

Braid (verb)—In this application, the definition of this verb includes, but is not limited to, the following dictionary definition:
 1. To interweave three or more strands of (hair, straw, etc.).
 2. To tie up (something, e.g., hair) in a ribbon or band.
Braid (noun)—In this application, the definition of this verb includes, but is not limited to, the following dictionary definition:
 1. A string, cord, band, or plait, formed by weaving together different strands of any material.
 2. A woven tape or band of various materials, as cotton, wool, or silk, for binding, etc.

Monofilament—A single thread or fiber.

Reworkability—Reworkability of an adhesively-bonded display (e.g., LCD) in this invention is defined to mean that the cured bonded adhesive when desired or necessary can, without undue difficulty or long time requirement(s), be cleanly and effectively removed during disassembly of the display to remove a substrate (e.g., film or glass plate or touch panel) from being bonded to the display by the cured adhesive layer. An example where reworkability is desired and needed is when an air bubble or other defect is found in a bonded display. Other examples where reworkability is desired include cases where a component in a display becomes defective or there is damage to part of a display in use. In one or more of these events, it is highly desirable that the substrate and adhesive be removed from the display such that the bonding process can afterwards be repeated hopefully to afford a bonded display without the flaw, damage, or defect being present subsequent to reworking. If reworking is not feasible, then the defective bonded display cannot typically be corrected and is usually then discarded, which corresponds to a relatively high value loss of the display as well as the film or plate.

More specifically, a cured adhesive (bonding a substrate to a display) that is reworkable is one that is compatible with a thread, a wire or other rework tool to be drawn/sawed/sliced/cut through it and thereby afford a basically clean separation of the substrate from the de-bonded display. Typically after this drawing/sawing/slicing/cutting (drawing, sawing, slicing, and/or cutting) step, both the adhesive side of the display and the adhesive side of the substrate will have some residual adhesive on these two sides. Furthermore, subsequent to this step, a good adhesive that is reworkable is one that provides a clean separation of adhesive from the substrate, the de-bonded display, and/or other parts being bonded with the adhesive.

Line speed—The rate at which a moving line (e.g., thread or wire) in a de-bonding apparatus is released from a feed spool and taken up on a collection spool is termed the line speed and is measured in feet/minute.

Table speed—The rate at which a display or test sample that is undergoing de-bonding is advanced against a moving line (e.g., thread or wire) in a de-bonding apparatus is termed the table speed and is measured in feet/minute.

EXAMPLES

In each of the Examples, a photocurable adhesive was used to bond together a 4 inch×6 inch glass plate and a 4.25 inches×6.25 inches glass plate of 3 mm thickness for use in rework experiments. The uncured adhesive was acrylic-based and was comprised of an urethane acrylate oligomer, an acrylate monomer, and a photoinitiator as is well known to those skilled in the art of photocurable adhesives. The following test sample preparation procedure was used to make de-bonding test samples.

A stainless steel panel is machined to produce a 6.5 mm-deep recess that is 4 inches by 6 inches in dimension. A second recess is then machined to produce a frame around the first recess 3 mm deep with an outer dimension of 4.25 inches×6.25 inches. The piece is Teflon® coated, and machined depth adjusted to produce a Teflon® coated piece at the machined depths and overall dimensions indicated. This produces a fixture in which a 3 mm thick glass of 4 inches×6 inches length and width fits snugly into the bottom recess. Adhesive poured onto the glass fills a gap 0.5 mm in thickness. Cover glass 3 mm thick with 4.25 inches width and 6.25 inches length fits snugly over the adhesive. The following steps are executed to produce a test sample:

1. A 4"×6" sheet of 3 mm thick glass is laid into the first recess.
2. Approximately 10 ml of adhesive is poured onto the glass to provide a 0.5 mm cured adhesive thickness.
3. A sheet of 3 mm thick top glass with 4.25 inches width and 6.25 inches length is then laid onto the adhesive, forming a filled 0.5 mm adhesive layer between the glass sheets.
4. The resulting sample is cured in a tractor UV exposure machine equipped with a Fusion "D" bulb with a total dose of 6.8 Joules/square centimeter.
5. The cured sample is removed from the fixture and the resulting sample is then ready for use as a de-bonding test sample.

Test Device

A test device was used to effect de-bonding of the glass/cured adhesive/glass test samples in the Examples. The device that was used consisted of a 14 inch travel linear stage that used a ball screw drive which was powered by a Nema 23 size stepper motor. For some experiments, the stepper motor speed and direction was controlled by a Thechno-Isel Mac® 001 single axis controller. For other experiments, testing was also conducted using a West Summit Concepts, Inc. Z axis motion control system in place of the Thechno-Isel controller. The controller or motion control system was programmed to drive, at a preprogrammed speed, a linear stage with the mounting fixture affixed to it and holding the test sample, until it reached a home switch at which point it stopped.

A cutting thread or wire contained on a spool was utilized. This spool was mounted to a vertical plate that was perpendicular to the linear stage. The spool was supported on this plate via an axle and mount. A second (collection) spool was also present to collect the cutting thread or wire following its being fed from the first spool and used in de-bonding. On the opposite end of this axle there was a friction brake that applied drag to the line as it was being pulled. The braided line was pulled through the adhesive via a motor driven pulley that was mounted on the far side of the vertical mounting plate. Line tension was controlled via a friction clutch set with 18 pounds of holding drag. The speed of the line travel was controlled via a DC power supply. FIGS. 1-3 are Illustrations from different views of the test device that was used for de-bonding test samples and displays as described in the Examples.

Example 1

In this Example, PowerPro™ 100 pound fishing line (PowerPro, Grand Junction, Colo.) was used as a cutting line, which is made of a braided material. A test rework sample of glass/cured adhesive/glass prepared as described above was subjected to de-bonding using the above-described test device. This test sample was run at a line speed of 36 feet/minute, a table speed of 1 foot/minute, and at ambient temperature. This sample was effectively de-bonded with no damage to either glass piece. The calculated tensile strength (in pounds as reported by the manufacturer) to diameter (in millimeters) value for PowerPro™ 100 pound fishing line is 178.95 pounds/millimeter.

Example 2

In this Example, PowerPro™ 80 pound fishing line (PowerPro, Grand Junction, Colo.) was used as a cutting line. Testing was otherwise the same as in Example 1 and test results were virtually identical. The calculated tensile strength (in pounds as reported by the manufacturer) to diameter (in millimeters) value for PowerPro™ 80 pound fishing line is 185.27 pounds/millimeter.

Example 3

In this Example, PowerPro™ 80# and 100# fishing line (PowerPro, Grand Junction, Colo.) was used as a cutting line, which is made of a braided material. Test rework samples of glass/cured adhesive/glass prepared as described above were subjected to de-bonding using the above-described test device. A matrix of test samples were run at line speeds of the fishing line of 15, 17, and 23 feet/minute and at temperatures of 4° C., ambient, and 40° C. All of these test samples were effectively de-bonded with no damage to either glass piece. The calculated tensile strength (in pounds as reported by the manufacturer) to diameter (in millimeters) values for PowerPro™ 80# and 100# fishing line are 185.27 and 178.95, respectively.

Example 4

Testing in this Example was the same as in Example 1 except that the line used was a twisted cord Kevlar® thread obtained from the Thread Exchange, Waverville, N.C., the line speed used for this cutting thread was 42 feet/minute, and the table speed was 1 foot/minute. The part number and other information for this thread is KEV207NATL02BW, 2 ounce size 207, natural bond; 3 twisted strands. The diameter of this thread is 0.47 mm. In this test, the cured adhesive bond was sheared satisfactorily but it was necessary to run the thread longer after the sample linear stage travel was completed in order to complete the cutting task to separate the two glass pieces. In other tests with this twisted cord thread, the thread yielded by breaking or causing the glass to break from a buildup of adhesive.

Example 5

Testing in this Example was the same as in Example 1 except that the line used was a twisted cord Kevlar® thread (E. I. DuPont de Nemours, Wilmington, Del.). The part number and other information for this sample are as follows: Part number K291500, 28 turns per inch, 0.40 millimeter diameter, 2 twisted strands. Tests were done on two different thicknesses (5 mm and 1 mm) of 4 inch×6 inch bonded glass. While the adhesive was sheared, it was displaced more than it was effectively sawed. This displacement of adhesive caused a buildup of it under the glass, which consequently afforded glass breakage in some tests.

Example 6

Testing in this Example was the same as in Example 1 except that the line used was Stren® Super Braid, which is a braided thread with a reported strength rating of 50 pounds. The lime diameter is 0.36 millimeters. The line speed used for this cutting thread was 37 feet/minute, and the table speed was 1 foot/minute. The calculated tensile strength (in pounds as reported by the manufacturer) to diameter (in millimeters) value for Stren® Super Braid is 138.9 pounds/millimeter. In this test, the cured adhesive bond was sheared satisfactorily.

Example 7

In this Example, a 3×3 test matrix for de-bonding of glass samples at ambient temperature was run on 63 bonded samples of 4 inch×6 inch glass to glass bonded samples using the same adhesive as in Example 1. The line used in this testing was PowerPro® 80 pound fishing line. Line speeds were 19, 24, and 36 feet/minute in this test, and table speeds were 0.25, 1.0, and 1.5 feet/minute in this test. Results are expressed in terms of the number of tests that passed (P) and the number of tests that failed (F) for the test conditions of line speed and table speed as shown.

|  |  | Line Speed | | |
|---|---|---|---|---|
|  |  | 19 ft/min | 24 ft/min | 36 ft/min |
| Table Speed | .25 ft/min | 4P 3F | 3P 4F | 5P 2F |
|  | .5 ft/min | 5P 2F | 5P 2F | 6P 1F |
|  | 1.0 ft/min | 4P 3F | 6P 1F | 6P 1F |

While a true statistical trend was not established in this testing, test results indicated that a table speed of 1 foot/minute and a line speed of 36 feet/minute were best conditions within this test matrix to afford a balance of effectiveness and efficiency.

Examples 9-12

In these Examples, de-bonding of glass to glass test samples were started using four different monofilament lines. The monofilament lines that were tested are listed below along with their reported strengths and diameters.

| Monofilament Line (Supplier) | Tensile Strength (pounds)[a] | Diameter (mm) |
|---|---|---|
| MonoFilament (South Bend) | 50 | 0.76 |
| Florocarbon (Seaguar) | 25 | 0.48 |
| Stren Original (Stren) | 20 | 0.46 |
| Iron Silk (Berkley) | 12 | 0.33 |

[a]Tensile strength as reported by the manufacturer.

While these monofilament lines did afford de-bonding initially for a portion of each of these test samples, each of these lines was broken during the course of the testing before each of these test samples was completely de-bonded. Typically, line breakage occurred during the first third to one-half portions of these process runs as measured in the linear slide table direction. These experiments demonstrate that monofilament lines are not good choices of cutting materials to effect de-bonding. One reason for this is that the strength to diameter ratios of these monofilament lines are relatively low, and consequently the strength of each of these lines being of a size to fit within the 0.5 mm adhesive gap of the test sample is not sufficient.

Example 13

In this Example, a 12.1 inch (measured diagonally) display was de-bonded using the same equipment as was used in earlier Examples. This display had an adhesive bond gap thickness of 0.2 millimeters (200 microns). PowerPro® 100 pound fishing line having a diameter of 0.56 millimeters was used for the line. The table speed was 1 foot/minute and the line speed was 50 feet/minute. Very surprisingly, even though the diameter (0.56 millimeters) of this line exceeded the adhesive bond gap thickness (0.2 millimeters), this display was successfully de-bonded. In this test run, it took awhile for the moving line to get the de-bonding process started by peeling back of adhesive in the area of the line such that the separation between glass and display was increased sufficiently to accommodate the moving line. Once it started, this moving line successfully de-bonded this display to give an unbroken glass piece and a de-bonded display.

Additional Examples

Many additional experiments have been run using a variety of line materials, including monofilament, non-woven, and braided materials. These line materials have been tested under different processing conditions that include line speed, table speed (speed at which the test sample is advanced through the line), and temperature.

In one set of experiments, comparison was made of a 50 pound braided line to a 50 pound monofilament line as the moving line for de-bonding a test sample. In the case of the monofilament material, the line broke while in use for de-bonding a test sample. In sharp contrast, the braided 50 pound line was successfully used to de-bond a test sample and did not break over the course of the experiment.

In another set of experiments, the effect of table speed upon de-bonding a test sample was examined using both monofilament and braided materials for the moving line. Surprisingly, it was found that a higher table speed was better for de-bonding with a braided line while being worse for de-bonding with a monofilament line.

Summary of Test Results

Table 1 shows a summary of properties and performance for both braided and monofilament lines being used for de-bonding of glass-to-glass samples. Those lines that did not break during the course of testing and afforded complete de-bonding of the test samples and were rated good (G) for performance. Those lines that did break during the course of testing such that complete de-bonding of the test sample was not completed and were rated not good (NG) for performance (perf.).

TABLE 1

| Line | Diameter (mm) | Tensile Strength (pounds) | Ratio (pounds/mm) | Perf. |
|---|---|---|---|---|
| PowerPro ™ 100 | 0.56 | 100 | 179 | G |
| PowerPro ™ 80 | 0.43 | 80 | 185 | G |
| Stren SuperBraid | 0.36 | 50 | 141 | G |
| MonoFilament | 0.76 | 50 | 66 | NG |
| Florocarbon | 0.48 | 25 | 52 | NG |
| Stren Original | 0.46 | 20 | 44 | NG |
| Iron Silk | 0.33 | 12 | 36 | NG |

CONCLUSIONS

Surprisingly, it was found as shown by the above Examples that monofilament line materials do not work nearly as well as non-woven or braided materials. Braided materials work best and afford the highest line tensile strength to diameter ratio of the line as well as having a roughened surface that promotes an effective sawing-action during de-bonding with the moving line. The tensile strength to diameter ratio is critical to this invention in that high line strength is required to reduce or eliminate line breakage in use; however, the diameter of the line is limited in that it is often best if the line diameter is less than the thickness of cured adhesive in a bonded display or bonded test sample. In our test samples (unless otherwise stated), this thickness was 0.5 mm.

What is claimed is:

1. A method for reworking a bonded display having a surface and a substrate adhesively bonded with a cured adhesive layer to the surface of the display, the method comprising:
    a) advancing the bonded display, from an edge or a corner of the display to an opposing edge or an opposing corner of the display, through a moving line in a manner such that the cured adhesive layer contacts the moving line resulting in break-up of the adhesive layer such that the substrate is no longer bonded to the display; and
    b) removing the cured adhesive layer from the display to afford a de-bonded display and the substrate;
    wherein the moving line is fed from a first spool and collected using a second spool following its being fed from the first spool and used in de-bonding to afford the de-bonded display and the substrate and the moving line is comprised of a braided material.

2. The method of claim 1 wherein the moving line is within 10 degrees of being orthogonal to the direction that the cured adhesive layer is being advanced.

3. The method of claim 1 wherein the moving line is selected from the group consisting of a fiber, a rope, a thread, and a wire.

4. The method of claim 1 wherein the moving line comprises a polymeric non-woven material.

5. The method of claim 1 wherein the moving line comprises a spun material.

6. The method of claim 1 wherein the moving line has a line speed that ranges from 1 foot/minute to 80 feet/minute.

7. The method of claim 6 wherein the table speed ranges from about 0.5 feet/minute to about 2.0 feet/minute.

8. The method of claim 1 wherein the bonded display is advanced through the line to effect de-bonding of the display at a rate ranging from about 0.01 feet/minute to about 10 feet/minute.

9. The method of claim 1 wherein the bonded display is contained within a holder during execution of the method to effect de-bonding.

10. The method of claim 1 wherein the moving line comprises a metal.

11. The method of claim 1 wherein the moving line comprises a textured conductive material having a rough surface.

12. The method of claim 1 wherein the moving line is a heated element that is heated to a temperature above ambient temperature during execution of the method.

13. The method of claim 1 wherein the moving line comprises a chemically pretreated element, the element having been treated prior to use with a chemical that serves to afford bond breakage of the cured adhesive layer.

14. The method of claim 1 wherein the moving line has a tensile strength (measured in pounds) to diameter (measured in millimeters) ratio of at least 80 pounds per millimeter for reworking a bonded display having a smaller side dimension of greater than 4 inches.

15. The method of claim 1 wherein the moving line has a tensile strength (measured in pounds) to diameter (measured in millimeters) ratio of at least 40 pounds per millimeter for reworking a bonded display having a smaller side dimension of less than or equal to 4 inches.

16. The method of claim 1 wherein the surface of the display is a front surface.

17. The method of claim 1 wherein the cured adhesive layer is one obtained by curing of a liquid photocurable adhesive.

18. The method of claim 1 wherein the moving line is operated at a line speed ranging from about 30 feet/minute to about 40 feet/minute.

19. The method of claim 1 wherein the table speed ranges from about 0.5 feet/minute to about 2.0 feet/minute.

20. A method for reworking a bonded liquid crystal display having a surface and a substrate adhesively bonded with a cured adhesive layer to the surface of the display, the method comprising:

a) advancing the bonded liquid crystal display, from an edge or a corner of the display to an opposing edge or an opposing corner of the display, through a moving line in a manner such that the cured adhesive layer contacts the line resulting in break-up of the adhesive layer such that the substrate is no longer bonded to the liquid crystal display; and b) removing the cured adhesive layer from the liquid crystal display to afford a de-bonded liquid crystal display and the substrate.

wherein the moving line is fed from a first spool and collected using a second spool following its being fed from the first spool and used in de-bonding to afford the de-bonded display and the substrate and the moving line is comprised of a braided material.

* * * * *